United States Patent [19]

Iida et al.

[11] Patent Number: 4,829,384
[45] Date of Patent: May 9, 1989

[54] CAMERA FOR SHOOTING MOVIE AND STILL PICTURES

[75] Inventors: Toshiharu Iida; Koji Shimanuki; Kimiaki Nakada; Seimei Ushiro, all of Tokyo, Japan

[73] Assignee: Fuji Photo Film Co., Ltd., Tokyo, Japan

[21] Appl. No.: 176,779

[22] Filed: Apr. 1, 1988

[30] Foreign Application Priority Data

Apr. 16, 1987 [JP] Japan .................................. 62-91906
Apr. 20, 1987 [JP] Japan .................................. 62-97141

[51] Int. Cl.$^4$ ........................................... H04N 5/225
[52] U.S. Cl. .................... 358/229; 358/209; 354/76
[58] Field of Search ................ 358/229, 209, 225, 76, 358/909, 906; 354/75, 76

[56] References Cited

U.S. PATENT DOCUMENTS

3,891,795  6/1975  Johnson et al. ..................... 358/225
4,714,962 12/1987  Levine ................................. 358/209
4,716,470 12/1987  Levine ................................. 358/229

Primary Examiner—Jin F. Ng
Assistant Examiner—Stephen Brinich
Attorney, Agent, or Firm—Birch, Stewart, Kolasch & Birch

[57] ABSTRACT

A video camera includes a casing having a generally rectangular parallelepiped shape, a first imaging optical system for shooting a still image and a second imaging optical system for shooting a video picture. The first and second imaging optical systems are disposed in a front surface of the casing so as to be directed to an object scene. A still camera unit is also disposed in the casing in the proximity of the first imaging optical system for shooting the object scene to record a still picture thereof on a film. A video circuit is provided in the casing on the rear side of the second imaging optical system for shooting the object scene to form a video signal representing a movie picture thereof, and a video tape recording section is also provided in the casing on the rear side of the first imaging optical system for recording the video signal on a video tape. The casing includes a first opening to load a film in said still camera unit and a second opening to install a video tape cassette in the video tape recording section. The first and second openings are disposed in an upper surface of the casing.

11 Claims, 10 Drawing Sheets

CAMERA FOR SHOOTING MOVIE AND STILL PICTURES

BACKGROUND OF THE INVENTION

1. Field of the Invention

The present invention relates to a camera for shooting a movie picture and a still picture, and in particular, to a movie video camera configured in a unit together with a still camera using a silver-halide type of photographic film.

2. Description of the Prior Art

There has been a requirement to record a particular scene in the form of a still picture during a shooting operation of a television camera having a function to record a movie picture on a video tape, so called video camera. Conventionally, a still camera using a silver-halide film and a separate video camera using a video tape are carried about in such a case where when a scene suitable for a still picture appears during a shooting of the video camera, the operation of the video camera is interrupted to take the still picture by use of the still camera. In this situation, two units have to be used and in the shooting of the still camera, the operation of the video camera must be interrupted, which leads to various problems, for example, an important shooting chance may be lost.

To solve the problems above, what is desired is a video camera having a still picture shooting function configured in a single unit including a combination of a still camera and a video camera such that a still picture can be taken through an operation of the still camera without interrupting the shooting operation of the video camera. In such a video camera having the still picture shooting function, the still picture and the movie picture shooting functions are required to be effected simultaneously. Consequently, a satisfactory operability is indispensable so as to enable so-called "decision-free" operations.

Particularly, with consideration to portability it is desired that the still camera unit be configured so as to be enclosed in the surfaces of the overall contour of the video camera; furthermore, operating or handling means of the still camera unit and the video camera unit can be appropriately and readily manipulated by two hands or by a single hand.

In a case where the still camera unit and the video camera unit are combined in such a contour, for an efficient use of space in a casing thereof, it is necessary to dispose a portion of the video camera unit at the back of the still camera unit. However, when the still camera unit is loaded with a film, a rear cover of a dark compartment for the film is required to be opened and then closed in the still camera unit. Consequently, a space for allowing the rear cover to open and close is required between the rear end of the still camera unit and that portion of the video camera unit, which leads to a problem that the size of the camera cannot be minimized.

SUMMARY OF THE INVENTION

It is therefore an object of the present invention to provide a video camera having a still picture shooting function which has the satisfactory portability and operability, thereby solving the problems above.

Another object of the present invention is to provide a compact video camera having a still picture shooting function.

In accordance with the present invention, there is provided a video camera comprising a casing having, in general, a substantially rectangular parallelepiped shape, a first imaging optical system for shooting a still image and a second imaging optical system for shooting a video picture, said first and second imaging optical systems being disposed in a front surface of said casing so as to be directed to an object scene; a still camera unit disposed in said casing so as to be in the proximity of said first imaging optical system for causing said first imaging optical system to shoot the object scene to record a still picture thereof on a film; a video circuit section disposed in said casing so as to be on the rear side of said second imaging optical system for causing said second imaging optical system to shoot the object scene to form a video signal representing a movie picture thereof, and a video tape recording section disposed in said casing so as to be on the rear side of said first imaging optical system for recording said video signal on a video tape, said casing including a first opening through which said still camera unit is loaded with a film, and a second opening through which a video tape cassette is installed into said video tape recording section, said first and second openings being disposed in an upper surface of said casing, said first opening having a contour for enabling a magazine including said film to be inserted in a predetermined longitudinal direction of said magazine with a leader portion of said film drawn from said magazine, said first opening of said casing formed with an end portion having a shape to substantially straighten a curl of said film when said film is loaded.

Also in accordance with the present invention, there is provided a video camera comprising a casing having generally a substantially rectangular parallelepiped shape, a first imaging optical system for shooting a still image and a second imaging optical system for shooting a video picture, said first and second imaging optical systems being disposed in a front surface of said casing so as to be directed to an object scene; a still camera unit disposed in said casing so as to be in the proximity of said first imaging optical system for causing said first imaging optical system to shoot the object scene to record a still picture thereof on a film, a video camera unit disposed in said casing for causing said second imaging optical system to shoot the object scene to record a video signal representing a movie picture thereof on a video tape, and a housing for containing therein said first imaging optical system and said still camera unit so as to form a portion of said casing. The housing has a generally rectangular parallelepiped shape, said parallelepiped shape having a rear surface completing a dark compartment room for mounting therein said film to be exposed, said housing having a rear plate covering said rear surface, an opening being formed in either of an upper surface and a bottom surface of said parallelepiped shape to install the film through a drop-in loading operation, said housing having a cover member for covering said opening, said cover member having an end portion supported on said casing so as to be movable with respect to said casing, thereby exposing said opening. The rear plate includes an end portion linked with said housing so that said dark compartment is opened and is closed, and the cover member has movement transfer means for causing a movement on said rear plate, said movement being smaller than a movement of said cover member through a rotary motion. The rear plate, when said opening is exposed due to the rotary movement of said cover member, opens said dark compartment with a movement by means of said movement transfer means, said movement being smaller than the movement of said cover member.

BRIEF DESCRIPTION OF THE DRAWINGS

The objects and features of the present invention will become more apparent from the consideration of the following detailed description taken in conjunction with the accompanying drawings in which:

FIGS. 5-10 are schematic diagrams showing a drop-in loading mechanism of the still camera function section in the embodiment of FIG. 1 in which;

FIGS. 7 and 8 are side views of the housing viewed from the side of the casing in which FIG. 7 shows a state immediately before a film is loaded therein and FIG. 8 shows a state where the film is being loaded therein;

DESCRIPTION OF THE PREFERRED EMBODIMENTS

Referring now to the accompanying drawings, description will be given to embodiments of a video camera having a still picture shooting function according to the present invention.

Figure 1:
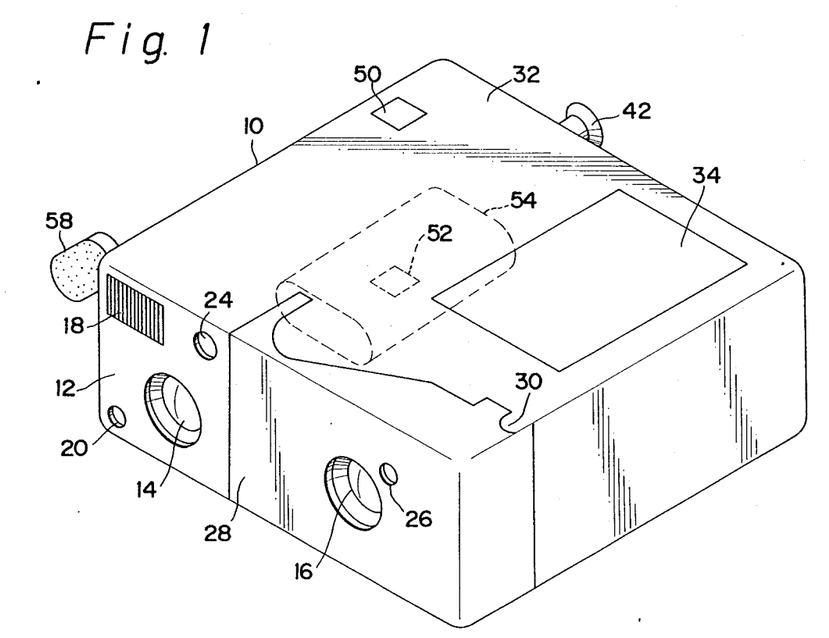
FIG. 1 is a perspective view of an illustration of an embodiment in which,, the present invention is applied to a so-called 8-millimeter (mm) video camera.

FIG. 1 shows an embodiment in which the present invention is applied to a so-called 8-millimeter (mm) video camera. Basically, the camera includes a casing 10 having generally the shape of a substantially rectangular parallelepiped, and the casing 10 contains a unit having a function of a video camera and a unit having a function of a still camera. The video camera unit uses as a video recording medium a video tape 100, FIG. 4, having a tape width of 8 millimeters (mm) so as to effect a movie video camera function which shoots an object scene to record a movie picture thereof in the form of a video signal on the video tape 100 together with a sound. The still camera unit in the embodiment is a still camera of the 135 type using a 35 mm silver-halide type of photographic film 102, FIG. 4, as an image recording medium and develops a still camera function which records a still picture of an object scene in the form of a latent image on the silver-halide photographic film 102.

The casing 10 includes a front surface 12 having a substantially rectangular shape in which two imaging lenses 14 and 16 are disposed. The one imaging lens 14 constitutes an imaging optical system of the video camera unit, whereas the other imaging lens 16 configures an imaging optical system of the still camera unit. In the proximity of the imaging lens 14 of the video camera unit, there are arranged, as shown in the figures, a strobe light emitting device 18, a light emitting device 20 for an automatic distance measurement or for an auto focusing (AF), and an objective lens 24 of an optical viewer 22, FIG. 3, to shoot a still picture. The optical viewer 22 has an eye cup where an eye is to be aligned is located in a rear surface of the casing 10. These two imaging lenses 14 and 16 are disposed to face the same object scene and this is also the case of the objective lens 24 of the optical viewer 22, which enables the still camera unit and the video camera unit in this system to shoot the same object scene. It is to be understood that an electronic view finder may be used in place of the optical viewer.

On a side of the casing 10, namely, on the left-hand side of this embodiment in FIG. 1, there is disposed a microphone 58 to pick up a voice and a sound from the object field. A microphone having a directivity associated with a single direction is advantageously employed for the microphone 58.

Figure 2:
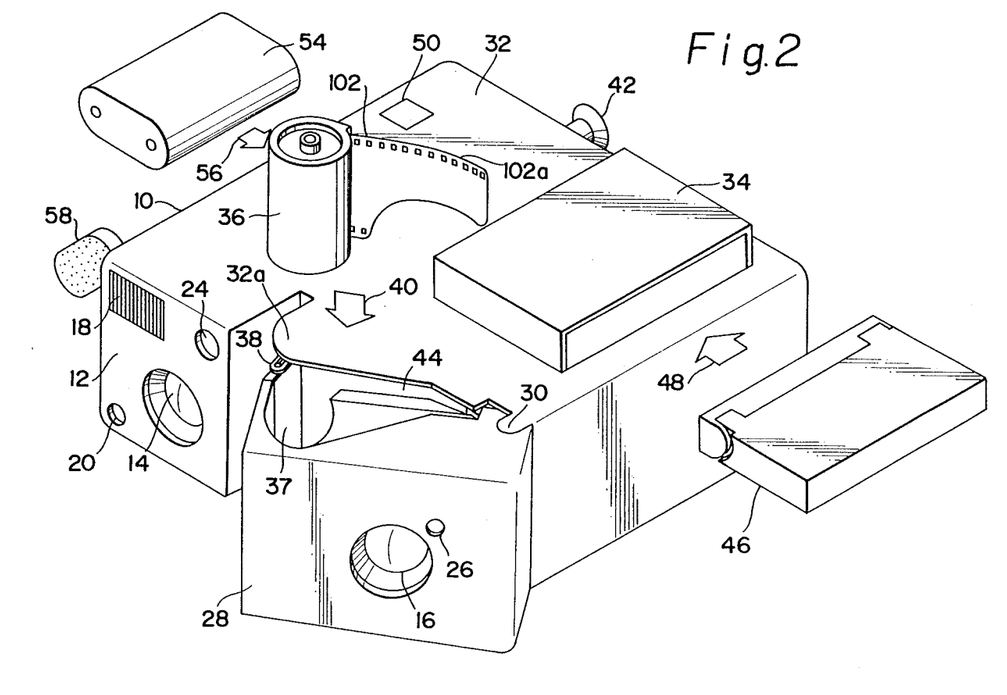
FIG. 2 is a perspective view of an illustration of the embodiment of FIG. 1 useful for understanding a utilization state thereof.

In the vicinity of the imaging lens 16 of the still camera unit, there is arranged a light receiving sensor 26 for an automatic distance measurement as shown in the figures. In the casing 10, a portion thereof including the front surface 12 forms an independent housing 28, which rotates a small angle about a hinge 30 as a pivotal axis thereof so as to open toward the front direction as shown in FIG. 2. In the housing 28, there are disposed an imaging optical system of the still camera unit including an imaging lens 16, an iris 104, and an optical shutter 106, FIG. 4, as well as various mechanisms necessary for the operation of the still camera such as an AF sensor 26, a film feed mechanism 108, and a portion of a focusing mechanism 112, FIG. 4. These elements enable an object image thus shot to be recorded on a film 102.

As can be seen from FIG. 2, the housing 28 is rotated toward the front side by an angle restricted by the movable arm 38, which forms an opening for a drop-in loading of the film 102. Namely, the drop-in loading of the film can be achieved in a state where the housing 28 is opened up to this position.

The drop-in loading is described for example in the Japanese Patent Laid-Open Publication No. 68731/1983. According to the description of the publication, in a state where the housing 28 is opened toward the front side, as indicated by an arrow 40, a film cartridge or patrone 36 is installed downward in a cartridge chamber 37, and at the same time, a leader 102a of the film 102 of the 135 type drawn from the film cartridge 36 by a slight length is inserted downward into a gap 44 vertically formed between a projection 32a of an upper surface 32 of the casing 10 and a rear section of the housing 28, thereby installing the film cartridge 36 in the cartridge chamber 37; thereafter, the housing 28 is restored to a closed position so as to easily complete the drop-in loading of the film.

On the upper surface 32 having a generally rectangular shape of the casing 10, there is disposed an open section as a cassette loading section 34. For the cassette loading section 34, when the operator depresses a switch button located in an operation display section 114, FIG. 4, to mount/detach an 8 mm video tape cassette 46, namely, an eject button to indicate an automatic loading operation of the cassette 46, the cassette loading section 34 moves upward/downward by use of a driving force of a motor so as to form an opening to load the cassette 46. As shown in FIG. 2, when the cassette loading section 34 moves upward, the 8 mm video tape cassette 46 can be installed in or removed from the loader section 34. The cassette 46 is inserted in a direction denoted by an arrow 48 and then the cassette loader 34 is moved downward to the original position, thereby detachably mounting the cassette 46 therein.

Furthermore, on the upper surface 32 of the casing 10, there is arranged a shutter release button 50 of the still camera unit as shown in the figure, whereas on the bottom surface of the casing 10, there is disposed a record button 52 of the video camera unit. The user holds the apparatus by fingers of both hands on the upper surface 32 and the bottom surface of the casing 10, and in this situation, the shutter release button 50 or the record button 52 can be pushed by either the first finger of the right hand or by the thumb thereof.

In FIG. 1, at a position of the casing 10 indicated by a dotted line 54, there is detachably installed a power source, for example, a secondary battery of this apparatus. When a cover of a battery mount section located in a side wall of the casing 10 is opened, the battery 54 can be mounted therein from a direction denoted by an arrow 56 of FIG. 2.

Figure 4:
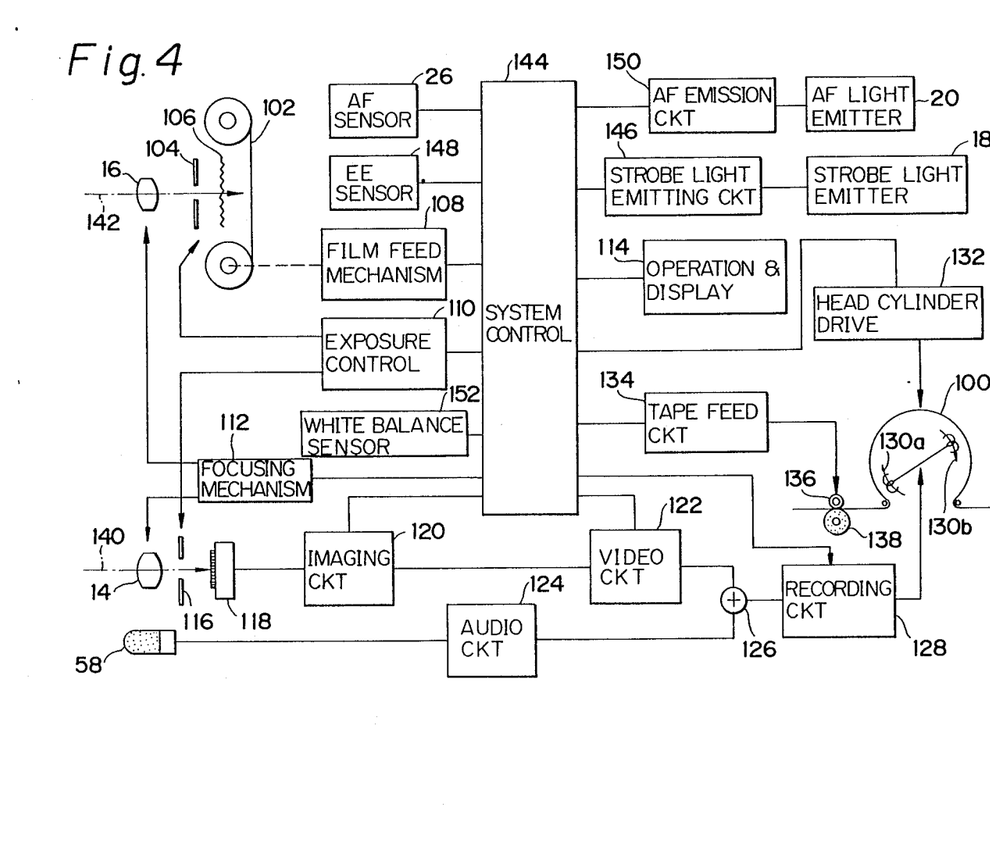
FIG. 4 is a schematic functional block diagram schematically illustrating an internal configuration example of the embodiment of FIG. 1.

Referring now to FIG. 4, there is shown an example of a circuit block diagram of the camera of FIG. 1. The imaging optical system of the video camera unit includes an imaging lens 14 and an iris 116 and a solid-state imaging device 118 such as a charge-coupled device (CCD) transducing an optical image of an object obtained through an imaging lens 14 from an optical signal into a video signal, these elements being located in a light path 140 of the incident light received from the object through the imaging lens 14.

Although the imaging lens 14 may be of a fixed-focus type, the focus position of this embodiment is controlled by an automatic focusing (AF) mechanism 112 in response to a distance measurement signal supplied from a system control circuit 144. For the iris 116, an automatic exposure adjust (EE) function is advantageously employed, namely, an appropriate exposure is attained by means of an exposure control or adjust circuit 110 in response to a distance measurement signal received from the system control circuit 144. The imaging device 118 is driven by an imaging circuit 120, and a video signal generated from the imaging device 118 is supplied via the imaging circuit 120 to a video circuit 122.

The imaging circuit 120 clocks the imaging device 118, a video signal outputted therefrom is amplified, and the resultant signal undergoes necessary corrections such as an adjustment of a white balance, thereby generating a composite video signal in the standard color television format including a luminance signal, a color difference signal, and a synchronizing signal. The obtained composite video signal obtained is delivered to the video circuit 122 so as to undergo various processing such as a preemphasis emphasizing a high-frequency component, a clamping to attain a predetermined signal level, and a frequency modulation transforming the signal into a recording signal suitable for recording thereof on a video tape 100, thereby supplying a resultant signal to a mixer 126.

On the other hand, a sound caught by the microphone 58 is converted by the audio circuit 124 into an audio signal, which is further subjected to processing such as amplification, an automatic gain adjustment, and frequency modulation thereby transforming the signal obtained into a recording signal suitable for the recording thereof on the video tape 100, thereby supplying a resultant signal to the mixer 126.

Figure 3:
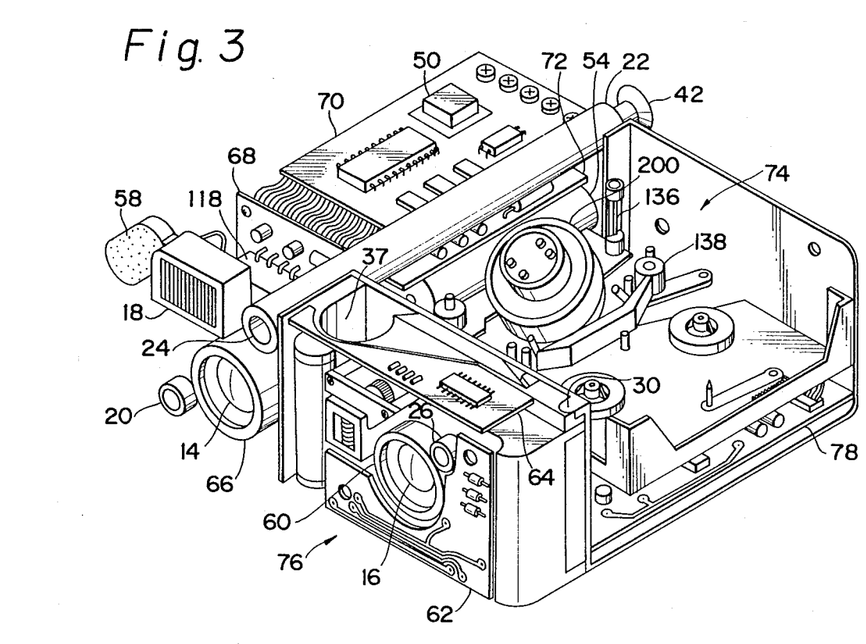
FIG. 3 is a perspective view schematically showing an internal structure of the embodiment of FIG. 1.

The recording signals associated with the composite video signal and the audio signal are mixed in the mixer 126 and are then amplified in a recording circuit 128 so as to be fed to a set of magnetic heads 130a–130b, which are secured on a head cylinder 200, FIG. 3, to have different azimuth angles and are rotated at a predetermined constant rotary speed by a head cylinder drive mechanism 132. The video tape 100 is held between a capstan 136 driven by the tape feed circuit 134 and a pinch roller 138 so as to be fed in a predetermined direction. Through these operations, the composite video signal and the audio signal supplied to the magnetic heads 130a–130b are recorded on the video tape 100.

The optical system of the still camera unit includes an imaging lens 16 followed by an iris 104, an optical shutter 106, and a film 102, with these components being arranged in a light path 142 of the incident light from the object. Although the imaging lens 16 may be of a fixed-focus type, the focus position of this apparatus is designed to be controlled by means of the focusing mechanism 112. For the iris 104 and the optical shutter 106, there is advantageously employed an automatic exposure adjust function by use of the exposure control circuit 110.

The film 102 is automatically loaded, wound on, and wound back by means of the film feed mechanism 108 in response to an instruction signal supplied from the system control circuit 144.

The system control circuit 144 controls various sections of this apparatus and, for example, effects a control on the tape feed circuit 134 in response to an operation of the record button 52 in the operation and display section 114, thereby controlling an operation to feed the video tape 100. Furthermore, for example, the system control circuit 144 controls the exposure control circuit 110, the focusing mechanism 112, and the strobe light emitting circuit 146 in response to an operation of the shutter release button 50.

The apparatus of this embodiment is provided with an automatic exposure (EE) sensor 148, which measures the brightness of the object scene so as to supply the system control circuit 144 with data indicating the measured value of the brightness. The system control circuit 144 controls the exposure control circuit 110 and the strobe light emitting circuit 146 depending on the brightness data of the object scene supplied from the EE sensor 148. In response thereto, the exposure control circuit 110 adjusts the opening of the iris 104 of the still camera unit and at the same time controls the exposure period of time for which the shutter 106 is to be kept opened. Furthermore, the strobe light emitting circuit 146 controls the period of time of the light emission effected by the stroboscopic light emitter 18.

The auto focusing (AF) light emitting element 20 is connected via the AF light emitting circuit 150 to the system control circuit 144. In response to an instruction from the system control circuit 144, the AF light emitting circuit 150 drives the AF light emitter element 20 to radiate, for example, an infrared light to an object; and then a portion of the infrared radiation reflected from the object is sensed by the AF sensor 26 so as to accomplish an automatic measurement of the distance between the apparatus and the object. The measured data of the distance is delivered from the AF sensor 26 to the system control circuit 144.

The distance is measured according to the principle of a trigonometric survey. In the apparatus, however, as can be seen from FIG. 1, since the distance or the base line between the AF light emitting element 20 and the AF sensor 26 is sufficiently long, the appropriate distance measurement can be accomplished. Depending on data of the distance between the apparatus and the object supplied from the AF sensor 26, the system control circuit 144 controls the focusing mechanism 112 to adjust the foci of both the two imaging lenses 14 and 16.

Furthermore, this apparatus is provided with a white balance sensor 152, which is sensitive to color components of an incident light from the object scene so as to deliver data of the color components to the system control circuit 144. Based on the data, the system control circuit 144 sets parameters to a white balance adjust circuit in the imaging circuit 120.

The operation and display section 114 is a functional unit which supplies the apparatus with an instruction manually entered and which visibly or audibly indicates a state of the apparatus to the operator. The operator's console 114 therefore comprises various operation buttons such as a shutter release button 50, a record button 52, a button to switch between an automatic operation and a manual operation for the adjustment of the focus, the exposure, and the white balance; buttons to set a fader, a wiper, and a title insertion of the video camera unit; operation buttons to set the recording, rewinding, and review operations of a video tape recording mechanism 74, FIG. 3; a strobe setting button of the still camera unit, and indicators such as for the operation mode display, the tape counter, the tape end alarm, the film counter, and the power level warning indicator.

Referring now to FIG. 3, there is schematically shown an internal configuration of the apparatus with the casing 10 removed in the state of FIG. 1. The housing 28 of the casing 10 primarily includes therein a still camera unit 76. For example, there are arranged, as shown in the figure, a lens unit 60 in which an imaging optical system including an imaging lens 16 of the still camera unit 76 and the AF sensor 26 are incorporated, and electronic circuit boards 62 and 64 on which such components associated with still camera functions an exposure control circuit 110, a focusing mechanism 112, an automatic light measurement and distance measurement circuit, an AF light emitting circuit 150, and a stroboscopic light emitter circuit 146 are mounted.

Following an imaging optical system unit 66 including the imaging lens 14 of the video camera unit, there is disposed, as shown in the figure, a solid-state imaging device 118 mounted on the electronic circuit board 68; furthermore, components associated with video camera functions are also mounted thereon such as an exposure control circuit 110, a focusing mechanism 112, and an automatic light measurement and distance measurement circuit. On the rear side thereof, there are arranged electronic circuit boards 70 and 72 including a video circuit 120 and an audio circuit 124, and a battery 54 is disposed therebelow.

As shown in FIG. 3, a video tape recording mechanism 74 comprising a video tape cassette loading section 34, a magnetic head cylinder 200, a capstan 136, and a pinch roller 138 is disposed on a back side of the still camera unit 76, and below the video tape recording mechanism 74, there are arranged a head cylinder drive mechanism 132 including a cylinder motor and the like and an electronic circuit board 78 mounting thereon mixer 126, recording circuit 128, tape feed circuit 134, and system control circuit 144. An optical view finder 22 is, as shown in this diagram, located between the electronic circuit board 70 and the video tape recording mechanism 74.

According to the embodiment of the present invention, as described above, the imaging lenses 14 and 16 are disposed in the front surface 12 of the casing 10 and the still camera function unit 76 is located in the proximity of the imaging lens 16 of the still camera unit; whereas circuits and mechanisms necessary for the operation of the video camera are arranged on the rear side of the imaging lens 14 of the video camera unit, and the video tape recording mechanism and circuits associated therewith are disposed on the back side of the still camera unit 76. The operation to load and unload the video tape cassette 46 and the drop-in loading of the film 102 can be accomplished through the upper surface 32 of the casing 10. The overall apparatus can be therefore configured in a compact shape, and, consequently, the operation to shoot a movie picture by the video camera unit and the operation to take a still picture by the still camera unit can be simultaneously effected without causing any interferences therebetween.

Figure 5:
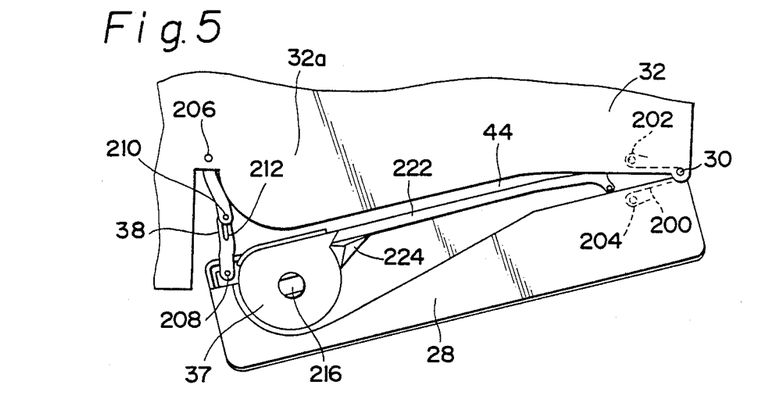
FIG. 5 is a plan view partially showing a state where a housing of the still camera unit is opened to load a film.

Referring now to FIGS. 5-10, the drop-in loading, DIL, of the still camera functional section will be described in detail according to the embodiment shown. FIG. 5 shows a state where a housing 28 which is a portion of a casing 32 is slightly opened from the casing 32. As can be seen from FIG. 5, a gap 44 having generally a long and narrow shape extends from the opening including a cartridge chamber 37 toward a hinge 38. The gap 44 has a width and a length for easily receiving a leader 102a of a film 102 drawn from a patrone or a magazine. A hinge 30 is engaged with a spring having a substantially L or V shape as indicated by a dotted line 200. One of the ends of the spring 200 is linked with a pin 202 of the casing and the other thereof is connected to a pin 204 of the housing 28. The spring 200 applies a force in a direction to open the housing 28 from the casing 32. When the housing 28 is completely closed in the casing 32, the magazine chamber 37 and the gap 44 are fully covered by a cover portion, namely, a projection 32a.

A movable arm 38 disposed in the proximity of the magazine chamber 37 includes two arms as shown in FIG. 5. One of the arms has an end rotatably engaged with a pin 206 of the casing 32 and the other thereof has an end rotatably linked with a pin 208 of the housing 28. Free ends of the arms are engaged with each other by use of a pin 210 and a long opening 212 as shown in the figure. Namely, the movable arm 38 restricts, in a maximum state of engagement, the long and narrow gap 44 formed when the housing 28 is opened from the casing 32. As a result, there is formed an opening for the drop-in loading to receive the patrone or magazine 36 with the leader 102a of the film 102 drawn therefrom. When the housing 28 is completely closed with respect to the casing 32, the movable arm 38 is folded so as to fully cover the magazine chamber 37 and the gap 44 by use of the cover portion 32a.

The magazine chamber 37 includes a generally cylindrical space in which the magazine 36 can be contained, and this space is defined by a magazine holding member 226 disposed as shown in the figure. The magazine chamber 37 has a cross-sectional shape substantially identical to a cross section of the magazine 36 and the gap 44 has a width and a length to easily receive the leader 102a of the film 102 drawn from the patrone or magazine.

Due to the contour of the opening, the magazine is installed in the magazine chamber 37 from but one direction with respect thereto. Namely, only in a situation where the projecting end of a take-up reel 214 of the magazine 36 faces upward and a cutaway portion 102b of the leader 102a of the film 102 directs toward the depth or the deeper portion of the gap 44, can the magazine 36 be received in the opening. As a result, the projecting end of the take-up reel 214 of the magazine is located on the side of the opening. Consequently, even in a state where the magazine 36 is fully installed in the magazine chamber 37, the projecting end of the take-up reel 214 can be held by the fingers so as to easily remove the magazine 36 therefrom.

Figure 9:
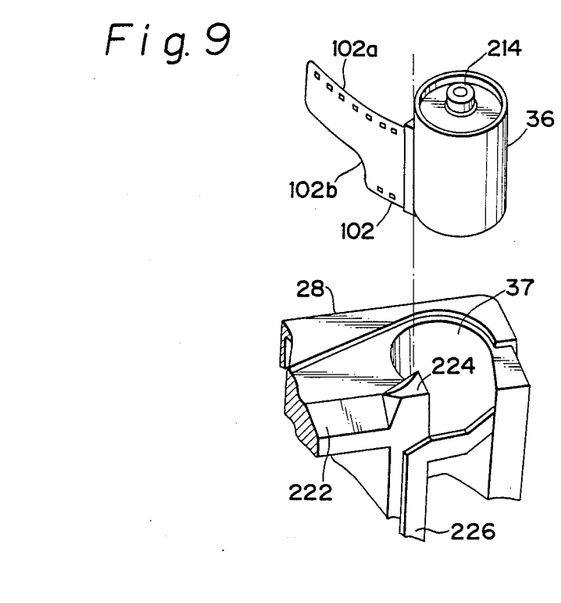

At the bottom of the magazine chamber 37, there is provided a roll-back reel 216 which projects to be engageable with an end of the take-up reel 214 of the magazine 36, FIG. 9. This roll-back reel 216 is mechanically linked with a film feeding mechanism.

Figures 6, 10:
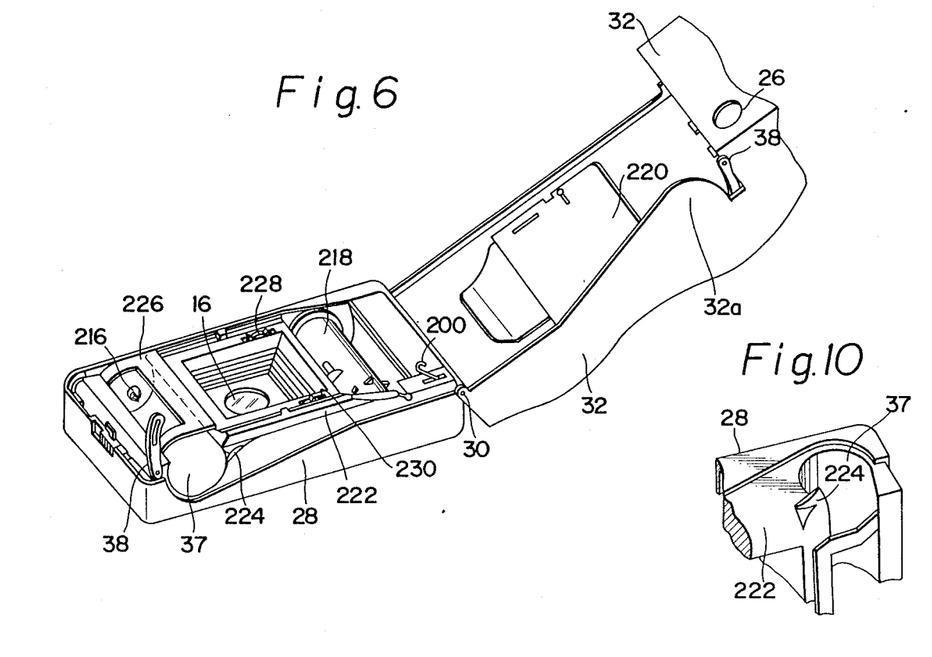
FIG. 6 is a perspective view of an illustration of the still camera unit in which a movable arm is disengaged to fully open the housing from the casing.
FIGS. 9 and 10 are partially cutaway, perspective views illustrating examples of projections formed in a film guide portion.

FIG. 6 shows a state where the two arms of the movable arm 38 are released so as to fully open the housing from the casing 32. As can be seen from this figure, on the opposite side of the roll-back reel 216 with respect to the imaging optical system 16, there is arranged a film take-up reel 218 mechanically linked with the film feeding mechanism 108. On the side of the casing, there is fixedly disposed a film pressure plate 220 at a position opposing to the optical system 16. Furthermore, on both sides of the optical system 16, there are respectively arranged a sprocket driving wheel 228 and a film counter driving wheel 230.

The casing 28 includes an end portion 222 forming the gap 44 for drop-in loading. As can be clearly seen from FIG. 9, the end portion 222 is formed as an inclined plane having an inclination toward the optical system 16. Moreover, as shown in FIG. 10, this portion 222 may also be constructed to have a curve with a predetermined curvature with respect to the direction. In addition, as can be readily seen from FIGS. 7 or 8 in which the housing 28 is viewed from the direction of the casing 32, a portion or the whole thereof forms an inclined plane slightly descending from the magazine chamber 37 toward the take-up reel 218.

The inclined plane, roundness, and inclination of the end portion 222 is a mechanism for the following purpose. Namely, when the housing 28 is opened in the state shown in FIG. 5 to effect a drop-in loading of the film 102 in the direction of an arrow 40 through the gap 44, FIG. 7, as the film 102 is lowered through an operation to insert the magazine 36 into the magazine chamber 37, the bottom end of the leader 102a of the film 102 is partially brought into contact with the end portion 222 such that the leader 102a slides thereon so as to be smoothly guided into an inside portion of the gap 44, FIG. 8. The leader portion 102a of the film 102 is usually curled because of its rolled state. The contour of the end portion 222 helps a function to use the curl of the leader 102a to smoothly feed the leader 102a in the gap 44 in which the curled portion is moved so as to be restored to its flat state.

Moreover, at an end of the end portion 222 on the side of the magazine chamber 37, a projection 224 is formed in a shape of FIGS. 9 or 10. The projection 224 functions as follows. As shown in FIG. 9, immediately before the magazine 36 is inserted into the magazine chamber 37, as the film 102 is lowered through the inserting operation, the cutaway portion 102b having a roundness of the leader 102a is brought into contact with the projection 224 such that the cutaway portion 102b passes thereover, thereby guiding the leader 102a in the gap 44.

Figure 7:
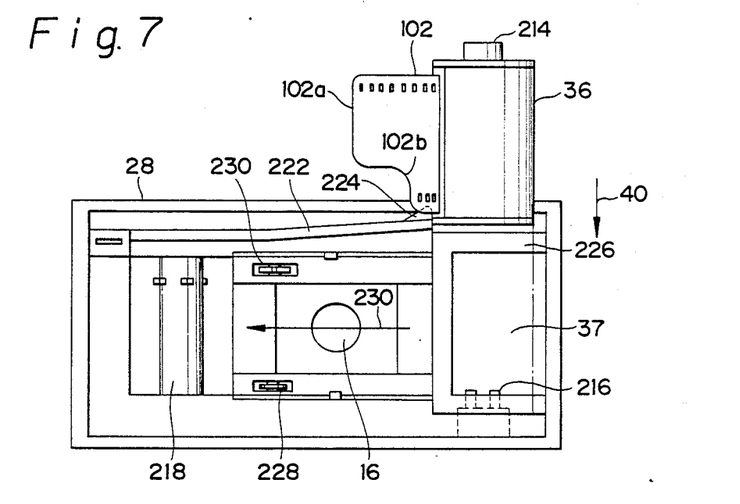
Figure 8:
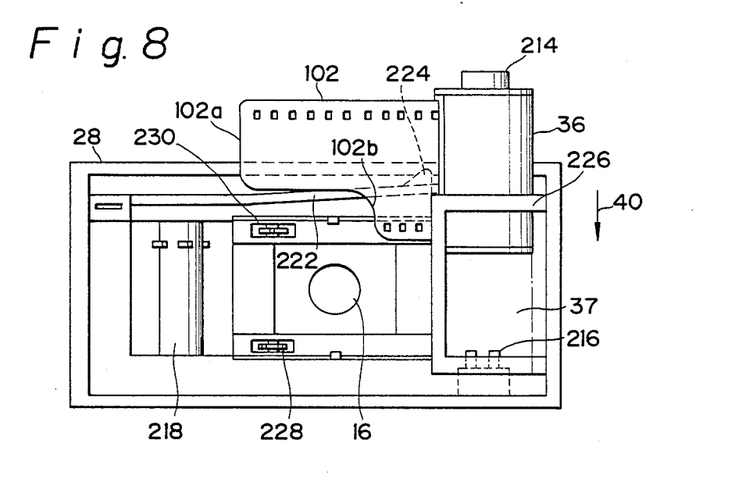

Through the mechanism above, when the housing 28 is opened in the state shown in FIG. 5 to achieve the drop-in loading of the film 102 from the gap 44 in the direction of arrow 40, as the magazine 36 in the state of FIG. 7 is inserted into the magazine chamber 37, the film 102 is lowered together with the leader 102b so as to be smoothly guided into the inside portion of the gap 44 as shown in FIG. 8. Finally, the magazine 36 is moved downward until the end on the bottom side of the take-up reel 214 of the magazine 36 engages with the roll-back reel 216. The leader 102b of the film 102 thus installed into the gap 44 in this state is fed in the roll-up direction 230 through an operation to link the sprocket driving wheel 228 with the sprocket holes of the film 102, thereby feeding the film 102.

In a video camera having a still picture shooting function according to the present invention, a pair of imaging optical systems respectively of the still camera unit and the video camera unit are disposed as openings in the front surface of the casing. A functional section of the still camera unit is disposed in the proximity of the imaging optical system of the still camera unit. Circuits and mechanisms necessary for the operation of the video camera unit are arranged on the rear side of the imaging optical system of the video camera unit, and the video tape recording mechanism and the associated circuits thereof are located on the back side of the still camera functional section. Furthermore, the operations to load and unload the video tape cassette and the film are accomplished through the upper surface of the casing. Consequently, there is provided a video camera having a still picture shooting function with a satisfactory portability and a high operability.

Figure 11:
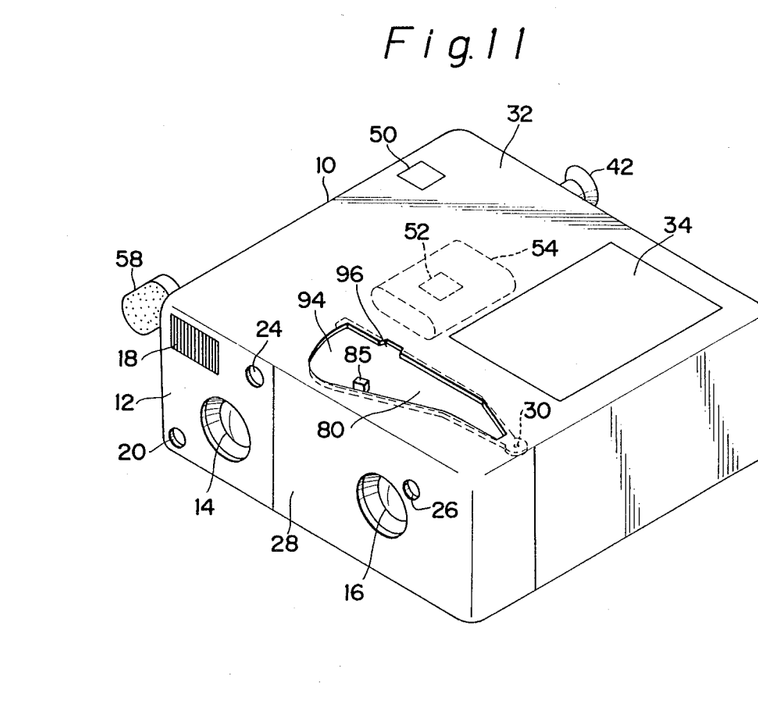
FIG. 11 is a perspective view showing an illustration of an alternative embodiment of the present invention.
Figure 12:
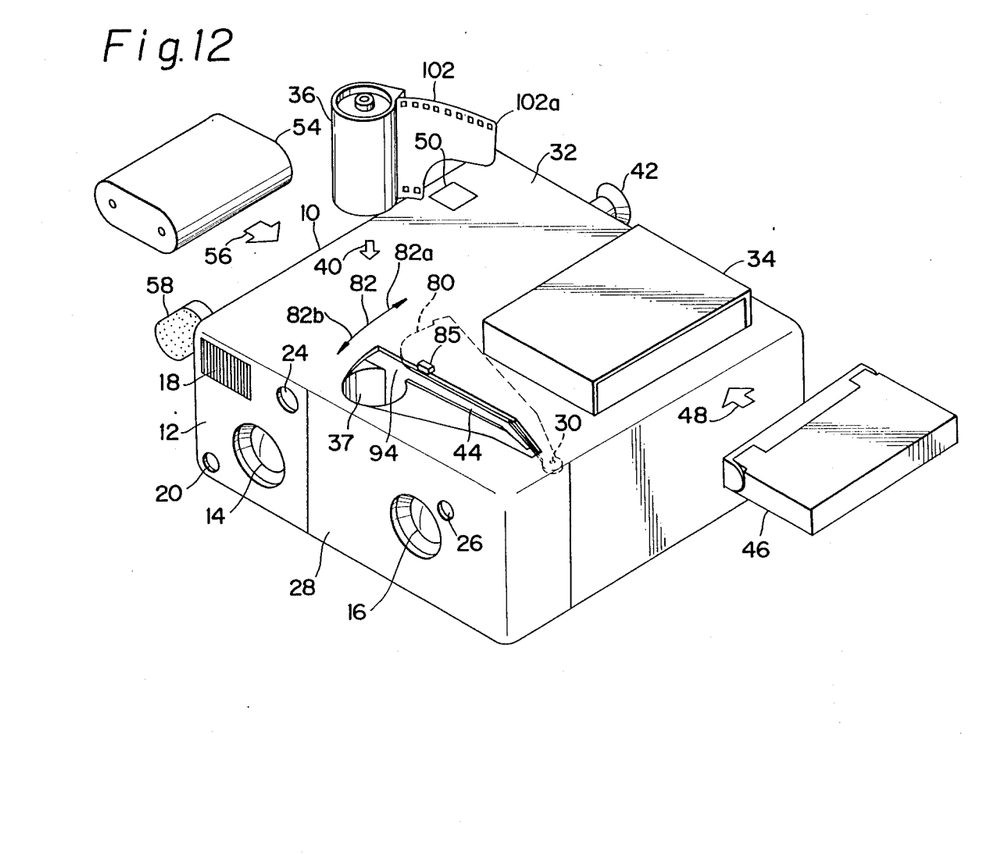
FIG. 12 is a perspective view of an illustration showing a state where a film is loaded in the embodiment of FIG. 11.

Referring next to FIGS. 11 and 12, a description will be given of an alternative embodiment according to the present invention. In the figures, similar components or structural elements are designated by the same reference numerals, and redundant description will be avoided for simplicity. In the alternative embodiment, the casing 10 has a portion including a front surface 12 thereof, the portion forming a separate housing 28. Naturally, the housing 28 may be integrated with the casing 10.

As shown in FIGS. 11 and 12, an opening having a substantially sectoral shape is formed in an upper surface of a still camera functional section of the housing 28, whereas a cover member 80 made of a thin plate having substantially the same contour as that of the opening 94 is disposed on an inner side of the upper surface of the housing 28. The cover member 80 is linked with the casing 10 so as to be rotatable about a hinge 30, as its pivotal axis, in the direction of an arrow 82. There is disposed a projection 85 thereon to rotate the cover member 80 by hand. The cover member 80 is configured to have a size and a contour such that a circumferential portion having a substantially sectoral shape can cover a magazine chamber 37 in which a film 102 is to be installed. Moreover, the opening 94 has a cutaway portion 96 which receives the projection 85 of the cover member 80 when the cover member 80 is rotated in the direction of an arrow 82a.

Figure 13:
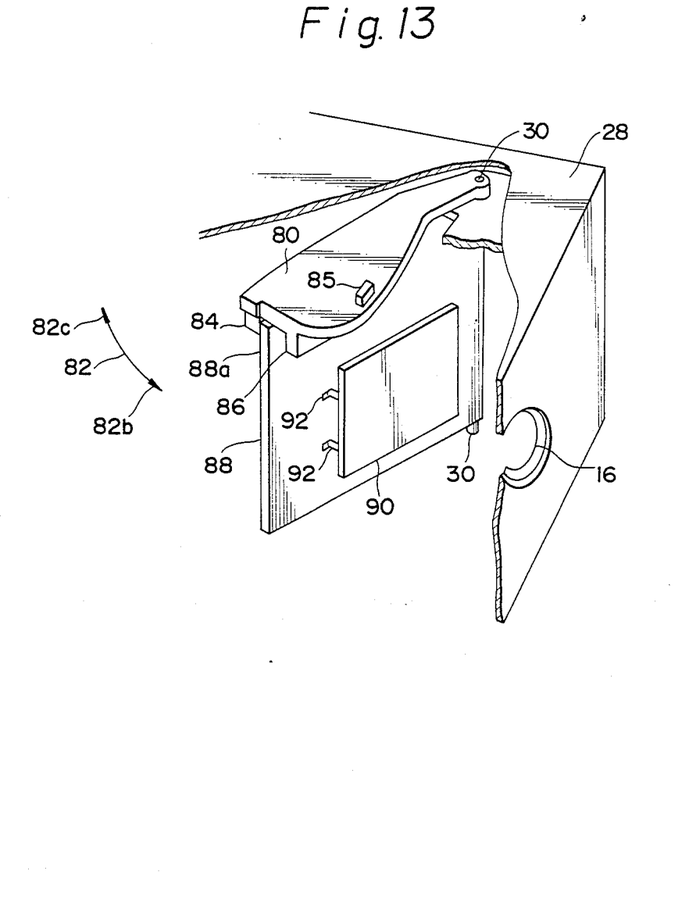
FIG. 13 is a perspective view illustrating a portion of the embodiment of FIG. 12.

As shown in FIG. 13, there is disposed in the cover member 80 a projecting portion 84 along an edge of a video tape cassette loading section 34, and at a position in the circumferential portion of the sectoral portion apart from a predetermined distance from the projecting portion 84, there is disposed another projecting portion 86 extending from a center of the sectoral contour toward the circumferential portion thereof.

On a rear plate 88 covering the rear portion of the housing 28 of the still camera unit, there is supported a pressure plate 90 by means of a spring 92. The rear plate is disposed, like the cover member 80, to be rotatable about the hinge 30 in the direction of the arrow 82 and has an upper end 88a located between the projecting portions 84 and 86. Consequently, when the cover member 80 in the closed state is rotated by the user in the direction of the arrow 82a, the rear plate 88 is pushed by the projecting portion 86 and is hence rotated. As a result, for a short period of time after the cover member 80 starts rotating, the rear plate is kept stationary, namely, when the cover member 80 rotates to an extent that the projecting portion 86 is brought into contact with the rear plate 88, the rear plate 88 is pushed by the projecting portion 86 and is therefore moved. As a consequence, as shown in FIG. 12, when the cover member 80 is rotated to close the magazine chamber 37 and a gap 44 is thereby formed between the housing 28 and the cover member 80, the amount of rotary movement of the rear plate 88 is smaller than that of the cover member 80. Consequently, the space to be disposed for opening and closing the rear plate 88 on the rear side of the housing 28 can be reduced.

When the cover member 80 in the opened state is rotated in the direction of the arrow 82b by the operator, the rear plate 88 is pressed by the projecting portion 84 and is hence rotated. As a result, for a short period of time after the cover member 80 starts rotating, the rear plate 88 is kept stationary. When the cover member 80 is rotated so as to cause the projecting portion 84 to be brought into contact with the rear plate 88, the rear plate 88 is pushed by the projecting portion 84 and is as a result moved, and when the cover member 80 is restored to the position shown in FIG. 11, the rear plate 88 is closely fixed to the rear surface of the housing 28 so as to be closed.

The installation of the film 102 in the still camera unit is effected through a drop-in loading via the opening formed by rotating the cover member 80 as shown in FIG. 12.

The drop-in loading operation is accomplished as follows. In this embodiment, with the cover member 80 opened to the position of FIG. 12, as indicated by an arrow 40, the magazine 36 of the film is inserted downward into the magazine chamber 37 of the housing 28 and the leader 102a of the 135 type film drawn by a slight length from the magazine 36 is also inserted downward into the vertical gap 44 formed between the cover member 80 and the rear portion of the housing 28, which installs the magazine 36 in the magazine chamber 37, and thereafter, the cover member 80 is fully moved back to the closed position, thereby easily completing the drop-in loading of the film.

According to the embodiment, as described above, the movie picture shooting of the video camera unit and the still picture shooting of the still camera unit can be simultaneously achieved without any mutual interference therebetween; moreover, the loading and unloading of the video tape cassette 46 and the drop-in loading of the film 102 can be accomplished through the upper surface 32 of the casing 10. Particularly, the installation of the film 102 through the drop-in loading operation is effected by rotating the cover member 80 with respect to the casing 10 so as to rotate the rear plate 88 of the housing 28 by use of the projecting portion 86 of the cover member 80 and to thereby expose the opening of the magazine chamber 37. Consequently, the amount of the movement of the cover member is smaller than that of the rear plate 88. As a result, the space disposed on the rear side of the housing 28 to rotate the rear plate 88 can be minimized. Consequently, the overall apparatus can be configured in a compact shape and size.

Incidentally, the distance between the pair of projecting portions 84 and 86 disposed in pair in the cover member 80 need only be appropriately designed with consideration of the necessary open/close angle of the cover member 80 and the space to be disposed on the rear side of the rear plate for the open and close operations thereof. In addition, in place of the elongated, projecting portions 84 and 86, two separate projections may be disposed on the cover member 80. Furthermore, the shape of the cover member 80 is not restricted by the sectoral shape, namely, the contour of the cover member may be arbitrarily selected only to cover the opening 94 in the state where the film 102 is loaded.

Although the still camera unit of the embodiments above employs a silver-halide photographic film, the camera may be of an instant photograph type and of an electronic still camera type recording a video signal on a magnetic disk or in an IC memory.

As described above, according to the video camera having a still picture shooting function of the present invention, the casing contains the still camera unit and the video camera unit so that the same object scene can be shot by both camera units.

In addition, the cover section which is rotated when loading a film in the still camera unit includes two projecting portions disposed in the rotating direction. Since these projecting portions cause the rear plate of the housing of the still camera unit to rotate, the amount of the movement of the rear plate is reduced when the cover and the rear plate are opened, which consequently minimizes the space disposed on the rear side of the housing of the still camera unit to open the rear plate and which hence enables to configure the overall apparatus in a compact shape and size.

While the present invention has been described with reference to the particular embodiments illustrated, it is not intended to be restricted by those embodiments but only by the appended claims. It is to be appreciated also that those skilled in the art can change or modify the embodiments without departing from the scope and spirit of the present invention.

What is claimed is:

1. A video camera comprising:
   a casing having a generally rectangular parallelepiped shape;
   a first imaging optical system for shooting a still image and a second imaging optical system for shooting a video picture, said first and second imaging optical systems being disposed in a front surface of said casing so as to be directed to an object scene;

a still camera unit disposed in said casing so as to be in the proximity of said first imaging optical system for causing said first imaging optical system to shoot the object scene to record a still picture thereof on a film;

a video circuit section disposed in said casing so as to be on the rear side of said second imaging optical system for causing said second imaging optical system to shoot the object scene to form a video signal representing a movie picture thereof; and a video tape recording section disposed in said casing so as to be on the rear side of said first imaging optical system for recording said video signal on a video tape;

said casing including a first opening through which said still camera unit is loaded with a film, and a second opening through which a video tape cassette is installed into said video tape recording section, said first and second openings being disposed in an upper surface of said casing;

said first opening having a contour for enabling a magazine including said film to be inserted in a predetermined longitudinal direction of said magazine with a leader portion of said film drawn from said magazine;

said first opening of said casing formed with an end portion having a shape to substantially straighten a curl of said film when said film is loaded.

2. A video camera in accordance with claim 1 wherein said end portion forming said first opening of said casing has a contour which is inclined in a direction from a portion of said first opening which receives said magazine toward a portion in which said film is rolled up.

3. A video camera in accordance with claim 1 wherein said end portion forming said first opening of said casing has a surface which is inclined in a direction in which said film is inserted.

4. A video camera in accordance with claim 1 wherein said end portion forming said first opening of said casing has a surface which is curved in a direction in which said film is inserted.

5. A video camera in accordance with claim 1 wherein a projection is formed in the proximity of a portion of the end portion forming said first opening of said casing to receive said magazine, said projection functioning such that said leader portion of said film, immediately before said film is inserted, is brought into contact with said projection so as to be guided in an inside of said first opening.

6. A video camera in accordance with claim 1 wherein said casing includes:
a housing for containing therein said first imaging optical system and said still camera unit; and
hold means for movably holding said housing on said casing such that said housing selectively takes a first position defining a first opening for a portion of said casing and a second position to close said first opening.

7. A video camera in accordance with claim 1 wherein said predetermined longitudinal direction is a direction in which a cutaway portion of said leader portion of said film is directed to a direction of depth of said first opening.

8. A video camera comprising:
a casing having a generally rectangular parallelepiped shape;
a first imaging optical system for shooting a still image and a second imaging optical system for shooting a video picture, said first and second imaging optical systems being disposed in a front surface of said casing so as to be directed to an object scene;
a still camera unit disposed in said casing so as to be in the proximity of said first imaging optical system for causing said first imaging optical system to shoot the object scene to record a still picture thereof on a film;
a video camera unit disposed in said casing for causing said second imaging optical system to shoot the object scene to record a video signal representing a movie picture thereof on a video tape; and
a housing for containing therein said first imaging optical system and said still camera unit so as to form a portion of said casing;
said housing having generally a substantially rectangular parallelepiped shape,
said parallelepiped shape having a front surface through which said first imaging optical system is opened,
said parallelepiped shape having a rear surface completing a dark compartment for mounting therein said film to be exposed,
said housing having a rear plate covering said rear surface,
an opening being formed in either of an upper surface and a bottom surface of said parallelepiped shape to install the film through a drop-in loading operation,
said housing having a cover member for covering said opening,
said cover member having an end portion supported on said casing so as to be movable with respect to said casing, thereby exposing said opening,
said rear plate having an end portion linked with said housing so that said dark compartment is opened and is closed,
said cover member having movement transfer means for causing a movement of said rear plate, said movement being smaller than a movement of said cover member through a rotary motion,
said rear plate, when said opening is exposed due to the rotary movement of said cover member, opening said dark compartment with a movement by means of said movement transfer means, said movement being smaller than the movement of said cover member.

9. A video camera in accordance with claim 8 wherein said movement transfer means includes two projecting portions disposed on a surface of said cover member on an inner side of said housing in a direction of said rotary motion,
said rear plate having a portion inserted between said two projecting portions.

10. A video camera in accordance with claim 9 wherein
said cover member has generally a sectoral shape,
said two projecting portions being portions having elongated shapes respectively extending from a center portion of said sectoral shape toward a circumferential portion thereof.

11. A video camera in accordance with claim 8 wherein said video camera unit includes:

a video circuit section for causing said second imaging optical system to shoot the object scene to generate a video signal representing a movie picture thereof;
a video tape recording section disposed in said casing so as to be on the rear side of said still camera unit for recording said video signal on a video tape;
said still camera unit and said video tape recording section being located with a gap therebetween, said gap being substantially corresponding to an amount of the movement of said rear plate.

* * * * *